United States Patent
Jiang et al.

(10) Patent No.: US 8,550,961 B2
(45) Date of Patent: Oct. 8, 2013

(54) ACTIVE DAMPING TIP-IN CLUTCH CONTROL OF A VEHICLE TRANSMISSION

(75) Inventors: Hong Jiang, Canton, MI (US); Matthew J. Shelton, Grosse Ile, MI (US); Zhengyu Dai, Canton, MI (US); Davor D. Hrovat, Ann Arbor, MI (US); Bradley D. Riedle, Northville, MI (US); Alexander P. McDonnell, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 13/156,476

(22) Filed: Jun. 9, 2011

(65) Prior Publication Data

US 2012/0312657 A1 Dec. 13, 2012

(51) Int. Cl.
*B60W 10/02* (2006.01)
*B60W 30/20* (2006.01)
*F16D 48/06* (2006.01)

(52) U.S. Cl.
USPC ........... 477/175; 477/180; 701/67; 192/103 R

(58) Field of Classification Search
None
See application file for complete search history.

(56) References Cited

U.S. PATENT DOCUMENTS

| | | | |
|---|---|---|---|
| 6,478,717 B1 | 11/2002 | Yu | |
| 6,991,585 B2 | 1/2006 | Colvin et al. | |
| 7,302,330 B1 | 11/2007 | Holtz et al. | |
| 7,455,619 B2 | 11/2008 | Jiang | |
| 7,637,842 B2 | 12/2009 | Tamai et al. | |
| 8,332,111 B2 * | 12/2012 | McDonnell et al. | 701/68 |
| 2009/0156356 A1 * | 6/2009 | Jiang | 477/86 |
| 2010/0105523 A1 | 4/2010 | Hrovat et al. | |
| 2011/0307150 A1 * | 12/2011 | Jiang et al. | 701/54 |

* cited by examiner

*Primary Examiner* — Richard M. Lorence
(74) *Attorney, Agent, or Firm* — James Dottavio; MacMillan, Sobanski & Todd, LLC

(57) ABSTRACT

A method for controlling an input clutch of a vehicle transmission during a tip-in includes using a current gear and rate of change of transmission input speed to determine a first torque modifier, if a peak or trough occurred in input speed, using the current gear and a difference between measured input speed and expected input speed to determine a second torque modifier, and changing a torque capacity of the clutch using said modifiers.

18 Claims, 4 Drawing Sheets

| Gear | | 1 | 2 | 3 | 4 | 5 | 6 |
|---|---|---|---|---|---|---|---|
| Input Speed (NI) Rate of Change | −10 | 1 | 1 | 1 | 1 | 1 | 1 |
| | −5 | 0.5 | 0.5 | 0.5 | 0.5 | 0.5 | 0.5 |
| | 0 | 0 | 0 | 0 | 0 | 0 | 0 |
| | 5 | −0.5 | −0.5 | −0.5 | −0.5 | −0.5 | −0.5 |
| | 10 | −1 | −1 | −1 | −1 | −1 | −1 |

Fig. 4

| Gear | | 1 | 2 | 3 | 4 | 5 | 6 |
|---|---|---|---|---|---|---|---|
| NI− NI_predicted | −100 | 2 | 2 | 2 | 2 | 2 | 2 |
| | −50 | 1 | 1 | 1 | 1 | 1 | 1 |
| | 0 | 0 | 0 | 0 | 0 | 0 | 0 |
| | 50 | −1 | −1 | −1 | −1 | −1 | −1 |
| | 100 | −2 | −2 | −2 | −2 | −2 | −2 |

Fig. 5

ACTIVE DAMPING TIP-IN CLUTCH CONTROL OF A VEHICLE TRANSMISSION

BACKGROUND OF THE INVENTION

1. Field of the Invention

This invention relates generally to the control of a transmission input clutch during a tip-in event using active damping that monitors input shaft speed of a dual clutch automatic transmission.

2. Description of the Prior Art

During normal operation of a dual-clutch automatic transmission the driven input is connected to the transmission output shaft through gears. Dual-clutch automatic transmission is sometimes referred to as powershift transmissions.

Powershift transmissions are sensitive to gear rattle in tip-in situations because of the lack of a torque converter as a damping device. It is possible for driveline oscillations to cause an audible sound in such transmissions during tip-in events due to oscillations in driveline torque and input speed causing speed and torque reversals on the transmission components.

The magnitude of torque that is transmitted by each of the input clutches, sometimes called input clutch torque capacity, must be carefully controlled to achieve an acceptable tip-in. If the clutch torque is increased too rapidly during a tip-in then the input shaft speed will start to oscillate, possibly causing gear rattle. But if the clutch torque is increased too slowly, the performance metrics for a tip-in will not be met, which can lead to driver dissatisfaction.

SUMMARY OF THE INVENTION

A method for controlling an input clutch of a vehicle transmission during a tip-in includes using a current gear and rate of change of transmission input speed to determine a first torque modifier, if a peak or trough occurred in input speed, using the current gear and a difference between measured input speed and expected input speed to determine a second torque modifier, and changing a torque capacity of said clutch using said modifiers.

The tip-in active damping strategy achieves a quick increase in clutch torque capacity during a tip-in while minimizing the oscillations of the input shaft speed.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 shows graphs of accelerator pedal displacement and input speed during a tip-in;

FIG. 4 is a table containing values of a torque modifier indexed by the transmission gear and the rate of change of input speed; and FIG. 5 is a table containing values of another torque modifier indexed by the transmission gear and the difference between input speed and predicted input speed.

DESCRIPTION OF THE PREFERRED EMBODIMENT

Figure 1:
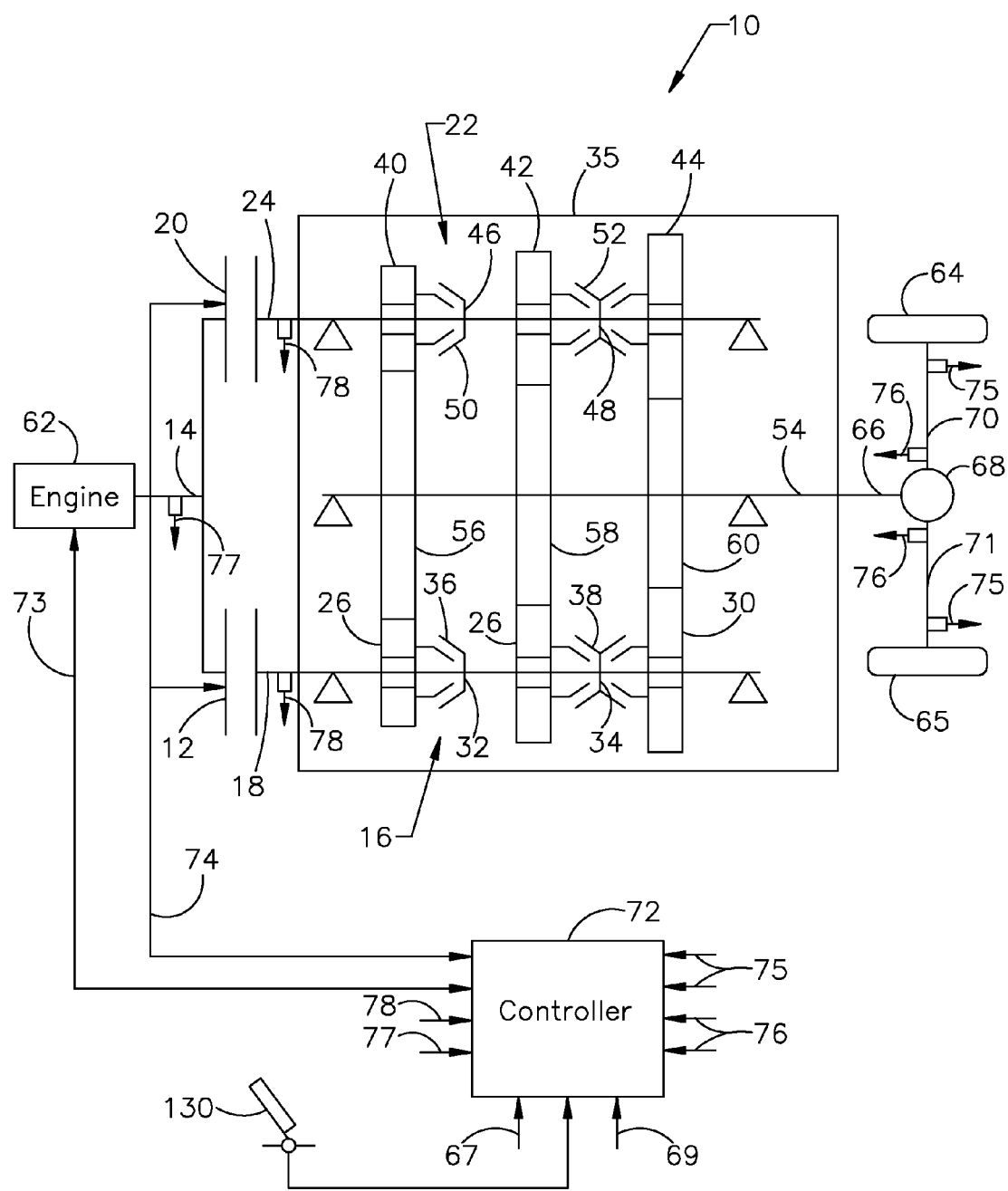
FIG. 1 is a schematic diagram showing details of vehicle driveline that includes a dual clutch powershift automatic transmission and a system for controlling the input clutches.

Referring now to the drawings, there is illustrated in FIG. 1a

The tip-in active damping strategy tries to achieve the quickest increase in clutch torque during a tip-in while minimizing the oscillations of the input shaft speed. The input shaft speed is monitored and compared against a predicted input shaft speed derived from the wheel speed. If the actual input shaft speed differs from the predicted speed by too much, then tip-in active damping strategy will modify the clutch torque rate of change. The active damping clutch torque rate is based on the maximum difference between the actual and predicted input shaft speeds. Clutch torque rate is also based on the acceleration of the input shaft speed. The input shaft speed acceleration is used to modify the clutch torque rate when the difference between the actual and predicted input shafts speeds becomes large enough that intervention is necessary. The acceleration based approach acts as a leading indicator of the overall difference between the actual and predicted speeds.

FIG. 1 illustrates details of a powershift transmission 10 that includes the first input clutch 12, which selective connects the input 14 of the transmission alternately to the even-numbered gears 16 associated with a first layshaft 18, and a second input clutch 20, which selective connects the input 14 alternately to the odd-numbered gears 22 associated with a second layshaft 24. A power source, such as an engine, is continuously driveably connected to the input 14. The road wheels of the vehicle are continuously driveably connected to the output 54 through a driveline, which may include final drive gearing, a driveshaft, a differential mechanism and laterally directed axle shafts, each axle shaft extending from the differential to one of the road wheels.

Layshaft 18 supports pinions 26, 28, 30, which are each journalled on shaft 18, and couplers 32, 34, which are secured to shaft 18. Pinions 26, 28, 30 are associated respectively with the second, fourth and sixth gears. Coupler 32 includes a sleeve 36, which can be moved leftward to engage pinion 26 and driveably connect pinion 26 to shaft 18. Coupler 34 includes a sleeve 38, which can be moved leftward to engage pinion 28 and driveably connect pinion 28 to shaft 18 and can be moved rightward to engage pinion 30 and driveably connect pinion 30 to shaft 18.

Layshaft 24 supports pinions 40, 42, 44, which are each journalled on shaft 24, and couplers 46, 48, which are secured to shaft 24. Pinions 40, 42, 44 are associated respectively with the first, third and fifth gears. Coupler 46 includes a sleeve 50, which can be moved leftward to engage pinion 40 and driveably connect pinion 40 to shaft 24. Coupler 48 includes a sleeve 52, which can be moved leftward to engage pinion 42 and driveably connect pinion 42 to shaft 24 and can be moved rightward to engage pinion 44 and driveably connect pinion 44 to shaft 24.

Transmission output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46, 52 may be synchronizers, or dog clutches or a combination of these.

A power source, such as an engine 62, is continuously driveably connected to the input 14. The road wheels 64, 65 of the vehicle are continuously driveably connected to the output 54 through a driveshaft 66. Torque is transmitted in a positive torque condition from the engine through a differential mechanism 68 and laterally directed halfshafts 70, 71 to the road wheels 64, 65. During negative torque condition torque is transmitted from the wheels 64, 65 to the engine 62.

Figure 3:
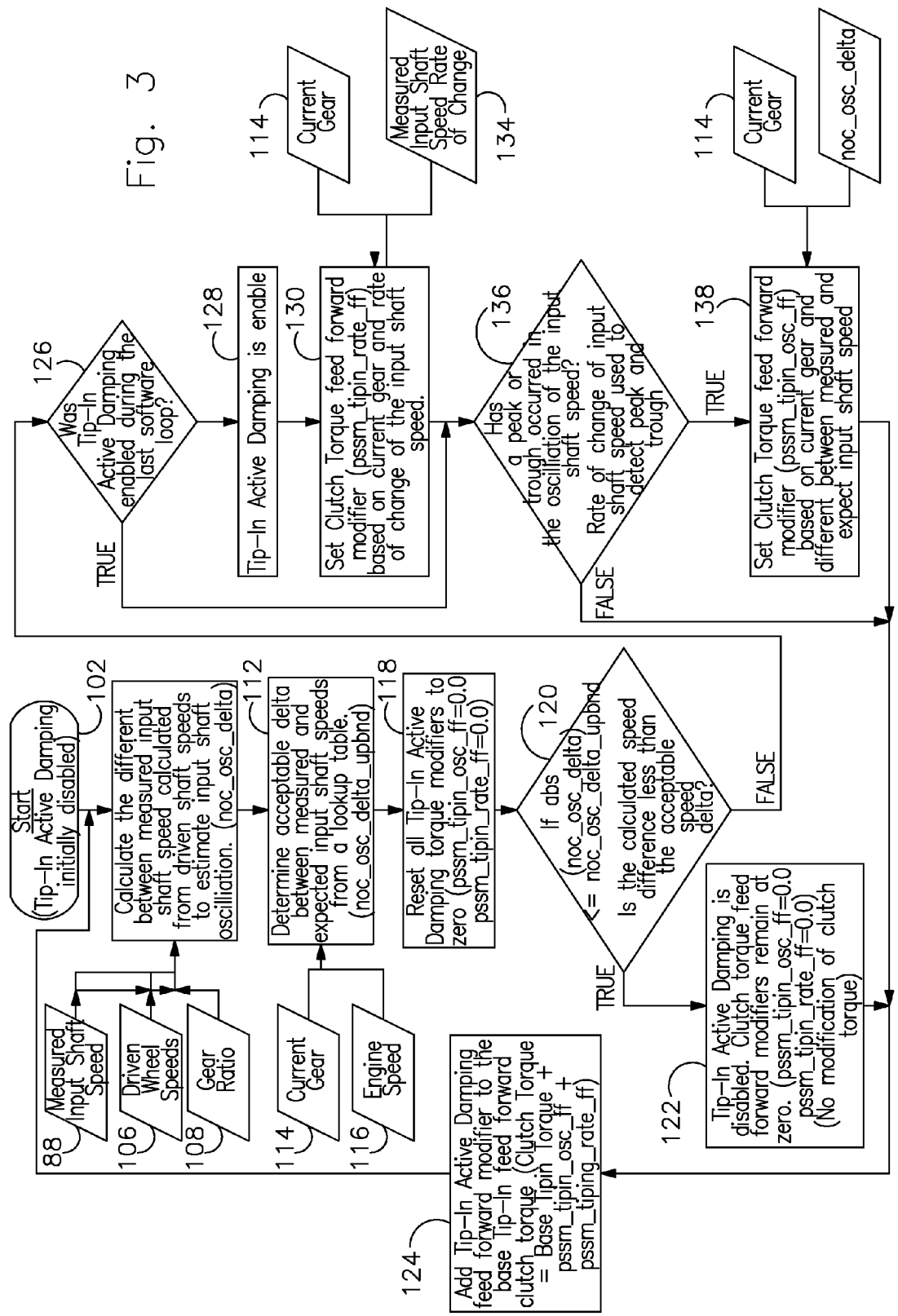
FIG. 3 is a logic flow diagram of an algorithm for controlling clutch capacity during the tip-in in the transmission of FIG. 1.

A controller 72, which includes a microprocessor accessible to electronic memory containing the algorithm 100 of FIG. 3, receives from an engine controller an input signal 67 representing torque produced by engine 62, and receives from a transmission controller an input signal 69 representing torque produced by the transmission input clutch 12, 20 corresponding to the current transmission gear. Controller 72 produces an output electronic signal 73 representing commanded engine torque, and an output signal 74 representing the commanded torque capacity of clutches 12, 20. Controller 72 also receives input signals 75, 76 representing the speed at the outboard and inboard ends, respectively, of halfshafts 70, 71; signal 77 representing the speed of transmission input 14; signal 78 representing the speed of layshaft 18; and signal 79 representing the speed of layshaft 24. The position of the vehicle's accelerator pedal 130 is represented by an input signal 69 communicated to controller 72. Controller 72 repetitively samples the input signals at each execution of the algorithm.

Figure 2:
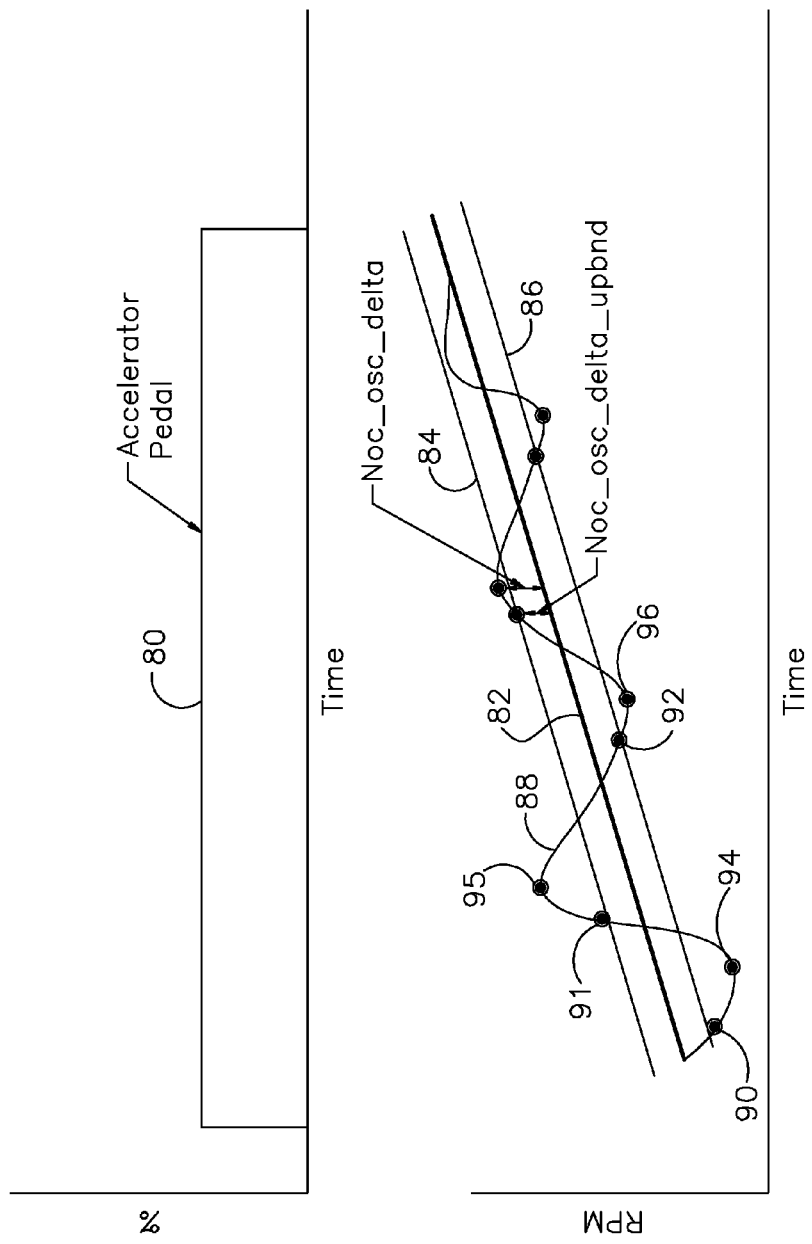

FIG. 2 shows displacement 80 of accelerator pedal 130 causing a tip-in event. Predicted or expected input speed 82, which increases during the tip-in, is bounded by an ascending upper limit 84 and an ascending lower limit 86.

FIG. 2 shows the variable noc_osc_delta which is the speed difference between the predicted input speed 82 and the current input speed 88. The variable noc_osc_delta_upbnd is the acceptable or target speed difference between the predicted input speed 82 and the input speed limit 84. The variable pssm_tipin_rate_ff, a clutch torque ramp rate modifier, is a function of the current gear in which the transmission 10 is operating and the rate of change of the measured input speed 88, and can be determined from a lookup table stored in electronic memory accessible to controller 72 during the tip-in at such points as 90, 91, 92. Similarly, variable pssm_tipin_osc_ff, a clutch torque ramp rate modifier, is a function of the current gear in which the transmission is operating and the difference between measured input speed 88 and expected input speed 82, and can be determined from a lookup table stored in electronic memory accessible to controller 72 during the tip-in at such points as 94, 95, 96.

An algorithm 100 for controlling input clutch torque capacity during the tip-in starts at step 102. The expected input speed 82 is determined from the average speed 106 of the driven wheels 64, 65 and the current gear ratio 108.

At step 110, measured input speed 88 and expected input speed 82 are used to determine the difference noc_osc_delta between measured input speed 88 and expected input speed 82 for the purpose of estimating input speed oscillation.

At step 112 the current gear 114 and engine speed 116 are used to determine an acceptable, target difference noc_osc_delta_upbnd between measured input speed 88 and expected input speed 82 from a look-up table accessible to controller 72.

At step 118 all the tip-in active damping clutch torque feed forward modifiers pssm_tipin_osc_ff and pssm_tipin_rate_ff are reset to zero.

A test is performed at 120 to determine whether the difference noc_osc_delta between measured input speed 88 and expected input speed 82 is equal to or less than the acceptable difference noc_osc_delta_upbnd between measured input speed 88 and expected input speed 82.

If the result of test 120 is logically true, at step 122 the tip-in active damping algorithm 100 is disabled, the clutch torque feed forward modifiers remain at zero, and input clutch torque capacity is not modified.

Then, at step 124 tip-in active the damping clutch torque feed forward modifiers are added to the base tip-in clutch torque to produce an updated clutch torque capacity, whereupon control returns to step 110.

If the result of test 120 is false, at step 126 a test is performed to determine whether tip-in active damping was enabled during the last execution of the algorithm 100.

If the result of test 126 is true, control advances to step 136.

If the result of test 126 is false, at step 128 tip-in active damping is enabled.

At step 130, the current gear 114 and current rate of change of the input speed 134 are used to determine the clutch torque capacity feed forward modifier (pssm_tipin_rate_ff) from a look-up table accessible to controller 72.

A test is performed at 136 using the rate of change of input speed to determine whether a peak or trough occurred in the input speed oscillation. Such peak or trough occurs when the rate of change of input speed decreases to zero and then increases.

If the result of test 136 is false, control moves to step 124.

If the result of test 136 is true, at step 138 current gear 114 and the current difference noc_osc_delta between measured input speed 88 and expected input speed 82 are used to set the clutch torque feed forward modifier (pssm_tipin_osc_ff).

At step 124, tip-in active damping clutch torque feed forward modifiers (pssm_tipin_osc_ff) and (pssm_tipin_rate_ff) are added to the base tip-in clutch torque to produce an updated clutch torque capacity, whereafter control returns to step 110, and the algorithm 100 is executed again.

FIG. 4 is a table containing values of torque modifier (pssm_tipin_rate_ff) indexed by the transmission gear and the rate of change of input speed; and FIG. 5 is a table containing values of another torque modifier (noc_osc_delta) indexed by the transmission gear and the difference between input speed and predicted input speed.

In accordance with the provisions of the patent statutes, the preferred embodiment has been described. However, it should be noted that the alternate embodiments can be practiced otherwise than as specifically illustrated and described.

The invention claimed is:

1. A method for controlling an input clutch of a vehicle transmission during a tip-in event, comprising:
   (a) using a current gear and rate of change of transmission input speed to determine a first torque modifier;
   (b) when input speed peaks or troughs, using the current gear and a difference between measured input speed and expected input speed to determine a second torque modifier;
   (c) changing a torque capacity of said clutch using said modifiers.

2. The method of claim 1 wherein step (a) further comprises:
   determining that said difference is greater than a target difference between expected input speed and a limit input speed.

3. The method of claim 2, wherein step (a) further comprises:

using speed of vehicle wheels and a current gear in which the transmission is operating to determine the expected input speed;
measuring a current input speed;
comparing said difference and the expected input speed.

4. The method of claim 1 wherein step (a) further comprises:
storing values of the first torque modifier in a table according to gear and the rate of change of transmission input speed;
determining the current a first torque modifier from the values of the table indexed by the current gear and the current rate of change of transmission input speed.

5. The method of claim 1 wherein step (b) further comprises:
storing values of the second torque modifier in a table according to a gear produced by the transmission and the difference between measured input speed and expected input speed;
determining the current a second torque modifier from the values of the table indexed by the current gear and the current difference between measured input speed and expected input speed.

6. The method of claim 1 wherein step (b) further comprises:
using a variation of the rate of change of input speed to determine if a peak or trough in input speed occurs.

7. A method for controlling an input clutch of a vehicle transmission during a tip-in event, comprising:
(a) using a current gear and rate of change of transmission input speed to determine a first torque modifier;
(b) after input speed produces a oscillation peak, using the current gear and a difference between measured input speed and expected input speed to determine a second torque modifier;
(c) changing a torque capacity of said clutch using said modifiers.

8. The method of claim 7 wherein step (a) further comprises:
determining that said difference is greater than a target difference between expected input speed and a limit input speed.

9. The method of claim 8, wherein step (a) further comprises:
using speed of vehicle wheels and a current gear in which the transmission is operating to determine the expected input speed;
measuring a current input speed;
comparing said difference and the expected input speed.

10. The method of claim 7 wherein step (a) further comprises:
storing values of the first torque modifier in a table according to gear and the rate of change of transmission input speed;
determining the current a first torque modifier from the values of the table indexed by the current gear and the current rate of change of transmission input speed.

11. The method of claim 7 wherein step (b) further comprises:
storing values of the second torque modifier in a table according to a gear produced by the transmission and the difference between measured input speed and expected input speed;
determining the current a second torque modifier from the values of the table indexed by the current gear and the current difference between measured input speed and expected input speed.

12. The method of claim 7 wherein step (b) further comprises:
using a variation of the rate of change of input speed to determine if a peak or trough in input speed occurs.

13. A method for controlling an input clutch of a vehicle transmission during a tip-in event, comprising:
(a) using a current gear and rate of change of transmission input speed to determine a first torque modifier when input speed crosses a speed limit;
(b) after input speed produces a peak or trough, using the current gear and a difference between measured input speed and expected input speed to determine a second torque modifier;
(c) changing a torque capacity of said clutch using said modifiers.

14. The method of claim 13 wherein step (a) further comprises:
determining that said difference is greater than a target difference between expected input speed and a limit input speed.

15. The method of claim 14, wherein step (a) further comprises:
using speed of vehicle wheels and a current gear in which the transmission is operating to determine the expected input speed;
measuring a current input speed;
comparing said difference and the expected input speed.

16. The method of claim 13 wherein step (a) further comprises:
storing values of the first torque modifier in a table according to gear and the rate of change of transmission input speed;
determining the current a first torque modifier from the values of the table indexed by the current gear and the current rate of change of transmission input speed.

17. The method of claim 13 wherein step (b) further comprises:
storing values of the second torque modifier in a table according to a gear produced by the transmission and the difference between measured input speed and expected input speed;
determining the current a second torque modifier from the values of the table indexed by the current gear and the current difference between measured input speed and expected input speed.

18. The method of claim 13 wherein step (b) further comprises:
using a variation of the rate of change of input speed to determine if a peak or trough in input speed occurs.

* * * * *